A. HAMILTON.
FLEXIBLE MOLDING.
APPLICATION FILED SEPT. 10, 1917.

1,285,688.

Patented Nov. 26, 1918.

INVENTOR.
Ashton Hamilton
by Jas. H. Churchill
atty.

ly at the transverse center of said
UNITED STATES PATENT OFFICE.

ASHTON HAMILTON, OF BROCKTON, MASSACHUSETTS.

FLEXIBLE MOLDING.

1,285,688.  Specification of Letters Patent.  Patented Nov. 26, 1918.

Application filed September 10, 1917. Serial No. 190,467.

*To all whom it may concern:*

Be it known that I, ASHTON HAMILTON, a citizen of the United States, and a resident of Brockton, in the county of Plymouth and State of Massachusetts, have invented an Improvement in Flexible Moldings, of which the following description, in connection with the accompanying drawings, is a specification, like characters on the drawings representing like parts.

This invention relates to a flexible molding capable of general use but which is especially adapted for use as a finish or trimming on the bodies of automobiles and like vehicles, furniture, etc.

The invention has for its object to provide a flexible molding having nails, brads, tacks or like fastening devices affixed thereto, with a member for forming a bead which extends lengthwise of the molding and is located above the heads of the nails or other fastening devices, and which is secured in fixed relation to the nail carrying strip or member by means of a jacket, as will be described, whereby a molding of greater flexibility, more attractive in appearance, less expensive to make, and which can be easily applied without marring its external finish and appearance, can be produced.

The bead member and the jacket may be secured directly to the nail carrying strip or it may be secured to a separate strip as will be described.

The particular features of the invention will be pointed out in the claims at the end of this specification.

Figure 1:
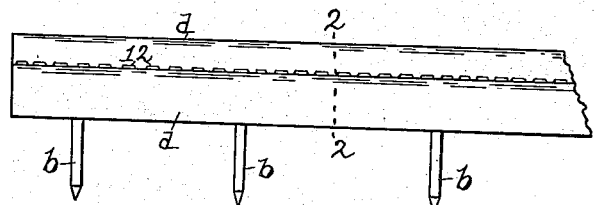

Figure 1 represents in side elevation and on an enlarged scale a sufficient portion of a flexible molding embodying this invention to enable it to be understood.

Figure 2:
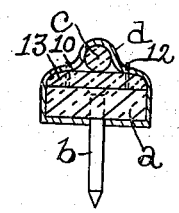

Fig. 2 a cross section on line 2—2 Fig. 1.

Figure 3:
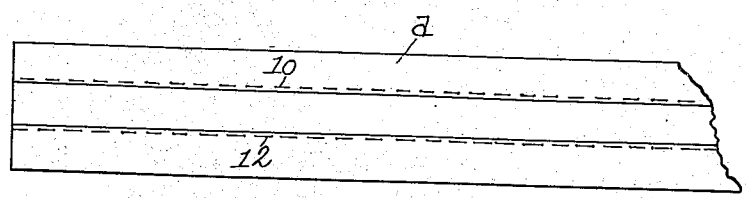

Fig. 3 a plan of the molding shown in Fig. 1.

Figure 4:
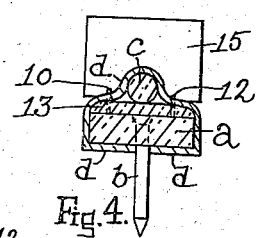

Fig. 4 a section like Fig. 2 showing the manner of applying the flexible molding.

Figure 5:
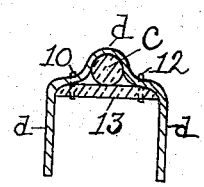

Fig. 5 a detail in section to be referred to, and

Figure 6:
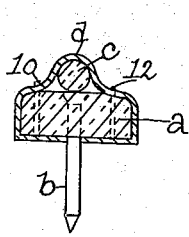

Fig. 6 a modification to be referred to.

Referring to the drawing $a$ represents a strip of leather, fiber board or other flexible material, through which are extended a plurality of small nails, brads, tacks or other like fastening devices $b$, which are located substantially at the transverse center of said strip. Above the nail carrying strip $a$ and in the plane of the nails $b$ is a bead forming member $c$, which may be circular or of other shape in cross section and composed of any suitable material which is flexible, such for instance as a cord. The bead forming member $c$ is covered by a jacket $d$ of thin material having a finished exterior surface, such for instance as patent or pebbled leather, which jacket serves to hold the bead forming member in place besides imparting to the flexible molding the finish desired.

The jacket $d$ may and preferably will be secured in fixed relation to the bead forming member $c$ by rows 10, 12, of stitches extended through the jacket on opposite sides of the bead forming member, and said rows of stitches may be extended through the nail carrying strip $a$ as indicated in Fig. 6, or as shown in Figs. 2, 4 and 5 through a separate thin strip 13, of fiber board or other less expensive material than the nail carrying strip, and which is cemented to the upper surface of the nail carrying strip.

The jacket $d$ may and preferably will be made wide enough to cover the sides of the nail carrying strip $a$ and be folded under and cemented to the bottom surface of the said strip. In either case, it will be noticed that the bead forming member is located above and in the plane of the fastening devices $b$, which in the arrangement shown in Figs. 1 to 4 are concealed by three layers of material, to wit, the strip 13, the bead forming member $c$ and the jacket $d$, and in the arrangement shown in Fig. 6 are concealed by two layers of material, to wit, the bead forming member $c$ and the jacket $d$. When the bead forming member and the jacket $d$ are secured to the nail carrying strip, a flexible molding is provided which is ornamental and attractive, and as the strip 13 can be made very thin or entirely omitted, the flexibility of the molding may be materially increased, so that it is capable of more closely conforming to the shape of the article to which it is applied, and so that it can be more easily applied in a minimum time, thereby effecting a material saving in the expense of trimming the article and enabling a more attractive and ornamental article to be produced.

The beaded flexible molding can be applied to the automobile body or other article without marring the external appearance of the molding by means of a suitable tool 15 shown in Fig. 4, which is provided on its under side with a recess for the reception of the bead and with surfaces on opposite sides of said recess for engagement with the molding on opposite sides of the bead. When the tool 15 is struck to drive the nails $b$, the blow is not concentrated at a point above the nail but is distributed over a substantially large area, thereby avoiding the external surface of the molding being injured or marred.

The fastening devices will be designated in the claims as nails.

Claims:

1. A flexible molding comprising a strip of flexible material, nails carried by said strip and projecting below the under surface thereof, a second strip of flexible material superimposed upon the nail carrying strip, a jacket of flexible material secured in fixed relation to said second strip on opposite sides of its longitudinal center to be handled as one piece therewith and to the nail carrying strip, and a bead forming member interposed between said jacket and said second strip substantially in the plane of the said nails.

2. A flexible molding comprising a strip of flexible material, nails carried by said strip and projecting below the under surface thereof, a jacket secured to said strip on opposite sides of its longitudinal center, a bead forming member interposed between said jacket and said nail carrying strip substantially in the plane of the said nails, and rows of stitches located on opposite sides of said bead forming member and extended through said jacket to secure the bead forming member in fixed relation to said jacket.

3. A flexible molding comprising a strip of flexible material, nails carried by said strip and projecting below the under surface thereof, a second strip of flexible material superimposed upon the said nail carrying strip and cemented thereto, a jacket of flexible material cemented to the under surface of the nail carrying strip, a bead forming member interposed between the said jacket and the said second strip, and rows of stitches located on opposite sides of the bead forming member and extended through said jacket and said second strip to secure the bead forming member in fixed relation to said second strip and jacket.

4. A flexible molding comprising a strip of flexible material, nails carried by said strip and projecting below the under surface thereof, a jacket secured to said strip, a bead forming member interposed between said jacket and said nail carrying strip substantially in the plane of said nails, and means located on opposite sides of the bead forming member to secure the latter in fixed relation to said strip and jacket.

In testimony whereof, I have signed my name to this specification.

ASHTON HAMILTON.